United States Patent

Goedderz et al.

[11] Patent Number: 5,943,893
[45] Date of Patent: Aug. 31, 1999

[54] ROLL-HARDENING MACHINE FOR CRANKSHAFTS

[75] Inventors: Dieter Goedderz, Erkelenz; Roland Heffe, Korschenbroich; Alfred Heimann, Aachen; Josef Janssen, Moanchengladbach, all of Germany

[73] Assignee: Hegenscheidt-MFD GmbH, Erkelenz, Germany

[21] Appl. No.: 09/082,286

[22] Filed: May 20, 1998

[30] Foreign Application Priority Data

May 28, 1997 [DE] Germany .................. 197 22 308

[51] Int. Cl.[6] ........................................ B21D 3/02
[52] U.S. Cl. .................. 72/110; 72/107; 29/6.01
[58] Field of Search ................. 72/110, 107; 29/6.01

[56] References Cited

U.S. PATENT DOCUMENTS

| | | | |
|---|---|---|---|
| 3,735,620 | 5/1973 | Naumann | 72/107 |
| 4,299,017 | 11/1981 | Gottschalk | 29/90 |
| 4,485,537 | 12/1984 | Berstein et al. | 29/6 |
| 4,539,831 | 9/1985 | Berstein et al. | 72/110 |
| 4,554,811 | 11/1985 | Hayashi et al. | 72/110 |
| 4,559,798 | 12/1985 | Hayashi et al. | 72/81 |
| 4,561,276 | 12/1985 | Berstein | 72/81 |
| 4,747,285 | 5/1988 | Berstein et al. | 72/110 |
| 4,747,286 | 5/1988 | Berstein et al. | 72/110 |
| 4,766,753 | 8/1988 | Berstein et al. | 72/110 |
| 5,138,859 | 8/1992 | Winkens | 72/110 |
| 5,445,003 | 8/1995 | Gottschalk et al. | 72/110 |
| 5,493,761 | 2/1996 | Bone | 29/6.01 |
| 5,495,738 | 3/1996 | Gottschalk | 72/110 |
| 5,575,167 | 11/1996 | Gottschalk et al. | 72/110 |

FOREIGN PATENT DOCUMENTS

0213256B1  7/1991  European Pat. Off. .

*Primary Examiner*—Joseph J. Hail, III
*Assistant Examiner*—William Hong
*Attorney, Agent, or Firm*—W. G. Fasse; W. F. Fasse

[57] ABSTRACT

A machine for hard-rolling a workpiece such as a crankshaft includes a drive apparatus (7) for rotating the crankshaft (8, 113), suspension apparatuses (9 to 17), hard-rolling devices (18 to 26, 111) movably supported by the suspension apparatuses, and a crankshaft transport apparatus (100). Each hard rolling device is a scissors jaw including two scissors arms (46, 47, 114, 115), with respective hardening roller heads (66 to 69, 118) and respective opposite counter-support heads (74, 119) mounted on the upper ends of the scissors arms facing the crankshaft. Each suspension apparatus (9 to 17) is slidably adjustable along the rotation axis (27) of the drive apparatus (7). A drive arrangement (49, 122) is connected to the lower ends of the scissors arms directed away from the crankshaft, for closing and opening the scissors arms to a maximum opening width (59, 130) that is larger than twice the maximum structural radius (60, 131) of the crankshaft. A respective angled bellcrank lever (78) is pivotally supported on each suspension apparatus, with one shank thereof pivotally connected to one scissors arm and the other shank thereof connected to a piston cylinder unit (84), which in turn is connected to the suspension apparatus (9 to 17). Guide members (88, 89) are provided for guiding the upper ends of the scissors arms.

20 Claims, 8 Drawing Sheets

ROLL-HARDENING MACHINE FOR CRANKSHAFTS

PRIORITY CLAIM

This application is based on and claims the priority under 35 U.S.C. §119 of German Patent Application 197 22 308.7, filed on May 28, 1997.

FIELD OF THE INVENTION

The invention relates to a machine for hard-rolling or roll hardening workpieces such as crankshafts, where the rolling operation may be for surface hardening or for deep rolling the workpiece. The terms "roll hardening" and "hard-rolling" are used interchangeably herein to refer to such deep rolling or such surface hardening rolling. The rolling machine especially includes a drive apparatus for rotationally driving the crankshaft that is to be rolled, and at least one hard-rolling device that is constructed in a scissors arrangement and that is movably supported on a respective suspension apparatus, which is slidable along the direction of the rotation axis of the drive apparatus. A respective hard-rolling roller head Find a respective counter support roller head are arranged facing opposite each other on the respective free ends of the two scissors arms of each hard-rolling device, whereby these respective free ends are the ends directed generally toward the rotation axis of the drive apparatus. The opposite ends of the scissors arms directed away from the rotation axis of the drive apparatus are driven for closing and opening the rolling tools.

BACKGROUND INFORMATION

A hard-rolling machine of the above described general type is based on an apparatus for deep rolling, surface hardening, and/or surface smoothing crankshafts, as described in European Patent 0,213,256 (Berstein et al.) and the respective corresponding U.S. Pat. No. 4,766,753 (Berstein et al.). Certain features of such an apparatus are also described in U.S. Pat. No. 5,138,859 (Winkens). The entire respective disclosures of U.S. Pat. No. 4,766,753 and U.S. Pat. No. 5,138,859 are incorporated herein by reference.

In connection with machines of the above described type, an apparatus for bringing-in and bringing-out the crankshafts is used for placing each respective crankshaft into the proper position to be rolled by the rolling machine, and then removing the crankshaft after the rolling operation. This apparatus in turn is loaded and unloaded by a crankshaft transport apparatus of a crankshaft machining system. While such a system is effective and suitable for the intended purposes, it has been found that the loading and unloading of crankshafts could be further simplified to speed up the machining cycle, reduce the machining costs, and reduce the capital expenditures required for the equipment.

SUMMARY OF THE INVENTION

In view of the above, it is an object of the invention to provide a hard-rolling machine of the above described general type, which is particularly configured and arranged so that the bringing-in or loading of a raw crankshaft into the machine, as well as the bringing-out or unloading of the finished hard-rolled crankshaft out of the machine, can be carried out simply and directly using the crankshaft transport apparatus of the crankshaft machining system. In other words, a specialized additional apparatus for bringing-in and bringing-out the crankshafts is to be avoided, and the loading and unloading operation is to be made simpler. The invention further aims to avoid or overcome other disadvantages of the prior art, and to achieve additional advantages, as apparent from the present description.

The above objects have been achieved in an apparatus for hard-rolling workpieces such as crankshafts, having the above-described general structure, and having further particular features according to the invention. The apparatus includes a drive arrangement for causing the closing and opening movements of the rolling tools and for generating the required hard-rolling force to be applied by each respective hard-rolling device, whereby the maximum jaw opening width or clearance between the respective rolling tools is greater than twice the maximum structural radius of a crankshaft or other workpiece that is to be roll hardened. The apparatus further includes an angled bellcrank lever that is swingably or pivotably connected to the above mentioned suspension apparatus and that includes a first lever shank and a second lever shank. One of the scissors arms of each respective hard-rolling device is journal-connected to the first shank of the angled bellcrank lever, while the second shank of the angled belocrank lever is connected to a piston cylinder device which in turn is connected to the suspension apparatus. A respective guide member with a guide surface is provided for guiding the motion of each respective free end of the scissors arms directed toward the rotation axis of the rotational crankshaft drive apparatus. According to a preferred embodiment, the drive apparatus for rotationally driving the workpiece is arranged to be slidable, i.e. slidably repositionable, in the direction of its rotation axis.

The drive arrangement for actuating the opening and closing of the rolling tools, and for applying the necessary rolling force, preferably comprises a two-armed lever that is pivotally connected to and supported on one of the scissors arms of the rolling tool jaws, a displacement cylinder or adjusting cylinder that is connected to the respective scissors arm and to the first arm of the two-armed lever, as well as a force applying device connected to the other scissors arm and to the second arm of the two-armed lever. The force applying device is especially embodied to include a plurality of pressure pistons arranged to extend substantially perpendicularly to, or tangent to a circle around, the rotation axis of the crankshaft drive apparatus.

A further detailed feature of the invention provides that the piston cylinder unit of each suspension apparatus is further provided with a clamping arrangement for tightly clamping the piston rod at a prescribed position. Advantageously, each piston cylinder unit is a pneumatic piston cylinder unit.

The free ends of the respective scissors arms of the rolling tool jaws, i.e. the ends of the scissors arms facing generally toward the rotation axis of the crankshaft drive apparatus, are each respectively equipped with a guide roller, which guidedly rolls along the above mentioned respective guide surfaces. In this manner, the scissors arms of the hard-rolling devices are guided into the proper operating position. More specifically, a positioning apparatus is provided and arranged for respectively positioning a plurality of hard-rolling devices into a proper pre-closing or ready position. According to an alternative embodiment, a pivot latch is arranged on an associated guide member for positioning each respective hard-rolling device into its proper pre-closing position.

According to an alternative embodiment of each hard-rolling device according to the invention, the drive arrangement for the respective hard-rolling device comprises an angled bellcrank lever pivotally connected and mounted on one of the scissors arms of the respective rolling device, a piston cylinder arrangement connected to this scissors arm and to one lever arm of the angled bellcrank lever, a cam drive arrangement formed by the other lever arm of the angled bellcrank lever and the other scissors arm, as well as a spring unit applying a biasing force effective in the direction for opening the respective hard-rolling device and thus biasing the cam drive into operative engagement between the other lever arm of the angled bellcrank lever and the other scissors arm.

The inventive arrangement for hard-rolling crankshafts, and particularly for hard-rolling the transition radii or gussets respectively between the crankwebs and the main bearing pins or connecting rod bearing crankpins, achieves several advantages. First, all of the hard-rolling devices can be embodied to be the same as each other, even to the extent of using the same individual hard-rolling roller heads. Also, the several suspension apparatus of the hard-rolling machine are respectively constructed from the same individual components.

Moreover, the inventive hard-rolling machine advantageously allows the hard-rolling devices for the crankpins to be automatically adjusted for different crankshaft types, which simply have different respective stroke distances or throws. It is also advantageous that the invention provides for the slidability or sliding adjustability of the crankshaft rotation drive apparatus, because this makes it possible to carry out a multi-stage rolling operation for rolling main bearing pins and crankpins that are greater in number than the number of the respective hard-rolling devices. In other words, a first group or set of the bearing pins can be rolled in a first rolling step, whereupon the crankshaft is slidingly shifted relative to the hard-rolling devices, and then the hard-rolling devices carry out a rolling operation on another group or set of the bearing pins.

DESCRIPTION OF THE DRAWINGS

In order that the invention may be clearly understood, it will now be described in connection with example embodiments, with reference to the accompanying drawings, wherein.

DETAILED DESCRIPTION OF PREFERRED EXAMPLE EMBODIMENTS AND OF THE BEST MODE OF THE INVENTION

Figure 1:
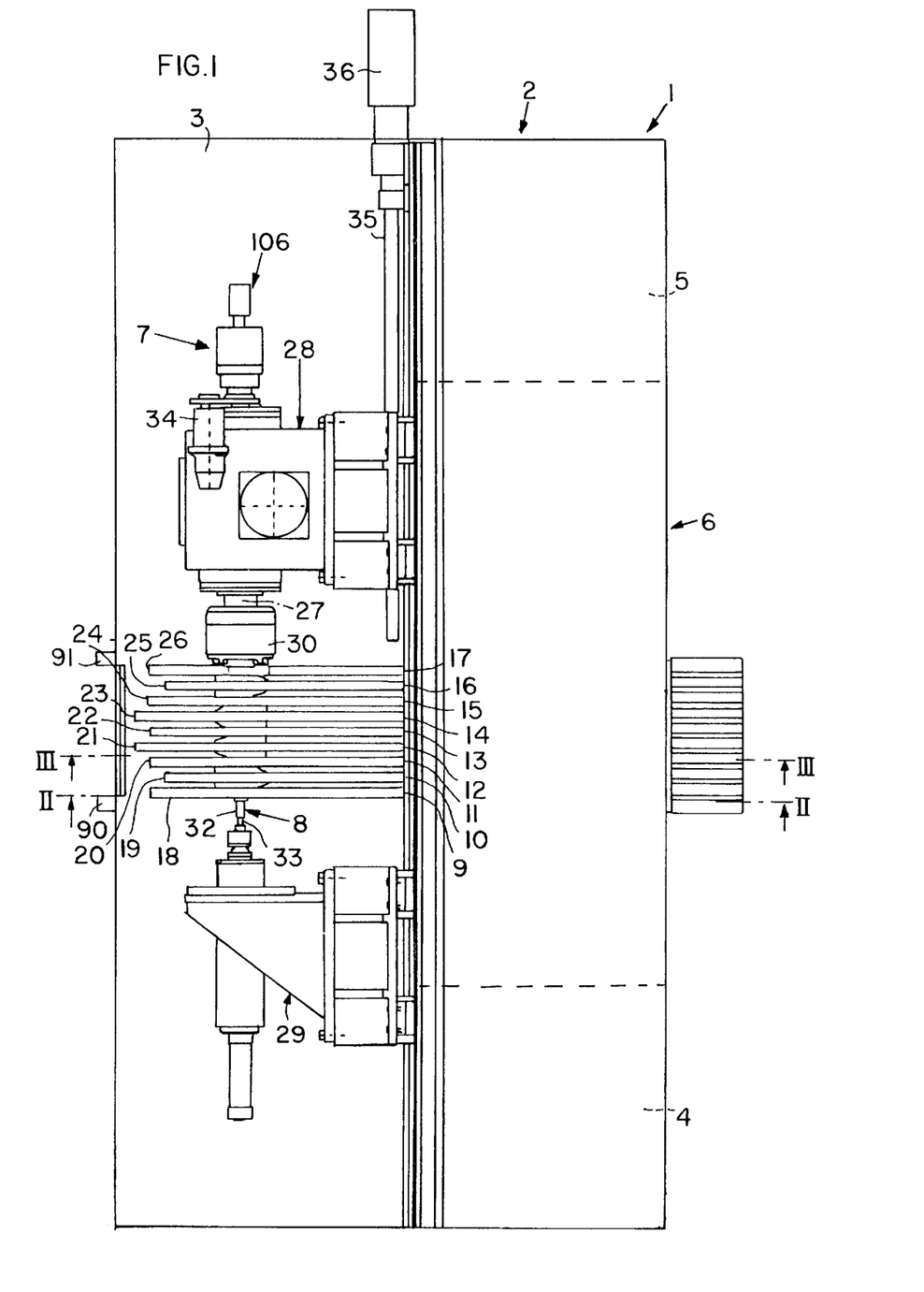
FIG. 1 is a schematic plan view of a hard-rolling machine according to the invention, with a crankshaft received therein, and having nine hard-rolling devices closed in position respectively on five main bearing pins and four crankpins of the crankshaft.

As shown in FIG. 1, a hard-rolling machine 1 includes a gantry-shaped frame 2 with a base plate 3, two side posts 4 and 5, and a cross-support 6. The side posts 4 and 5 are respectively rigidly connected to the base plate 3 and the cross-support 6. A crankshaft drive apparatus 7 for rotationally driving a respective crankshaft 8 that is to be roll-hardened, is arranged on and supported by the cross-support 6. Moreover, nine tooling suspension apparatus 9, 10, 11, 12, 13, 14, 15, 16 and 17 are arranged on and supported by the cross-support 6, and respectively carry a hard-rolling device 18, 19, 20, 21, 22, 23, 24, 25 and 26.

The rotation axis 27 of the crankshaft drive apparatus 7 extends parallel to the cross-support 6. The drive apparatus 7 comprises a head stock 28 and a tail stock 29, which are each slidably adjustable along the direction of the rotation axis 27, either individually or in common together. The sliding adjustment of the head stock 28 along the direction of the rotation axis 27 is achieved by means of a threaded spindle drive 35, which in turn is driven by a geared motor 36. A coupling or interconnection arrangement (not shown), when it is engaged or actuated, achieves a simultaneous sliding adjustment of the head stock 28 and the tail stock 29.

The crankshaft 8 to be roll-hardened is received, held and rotated between the head stock 28 and the tail stock 29. More particularly, a chuck or collet 30 of the head stock 28 clampingly holds and rotationally drives an end flange 31 of the crankshaft 8 (see e.g. FIG. 1A). On the other hand, a dead-center point 33 of the tail stock 29 holds the end bearing pin 32 of the crankshaft 8 in position, while allowing the crankshaft 8 to rotate. The rotational motion of the chuck or collet 30, and therewith the entire crankshaft 8 that is to be roll-hardened, is driven by a motor 34.

Figures 1A, 1W, 1X, 1Y, 1Z:
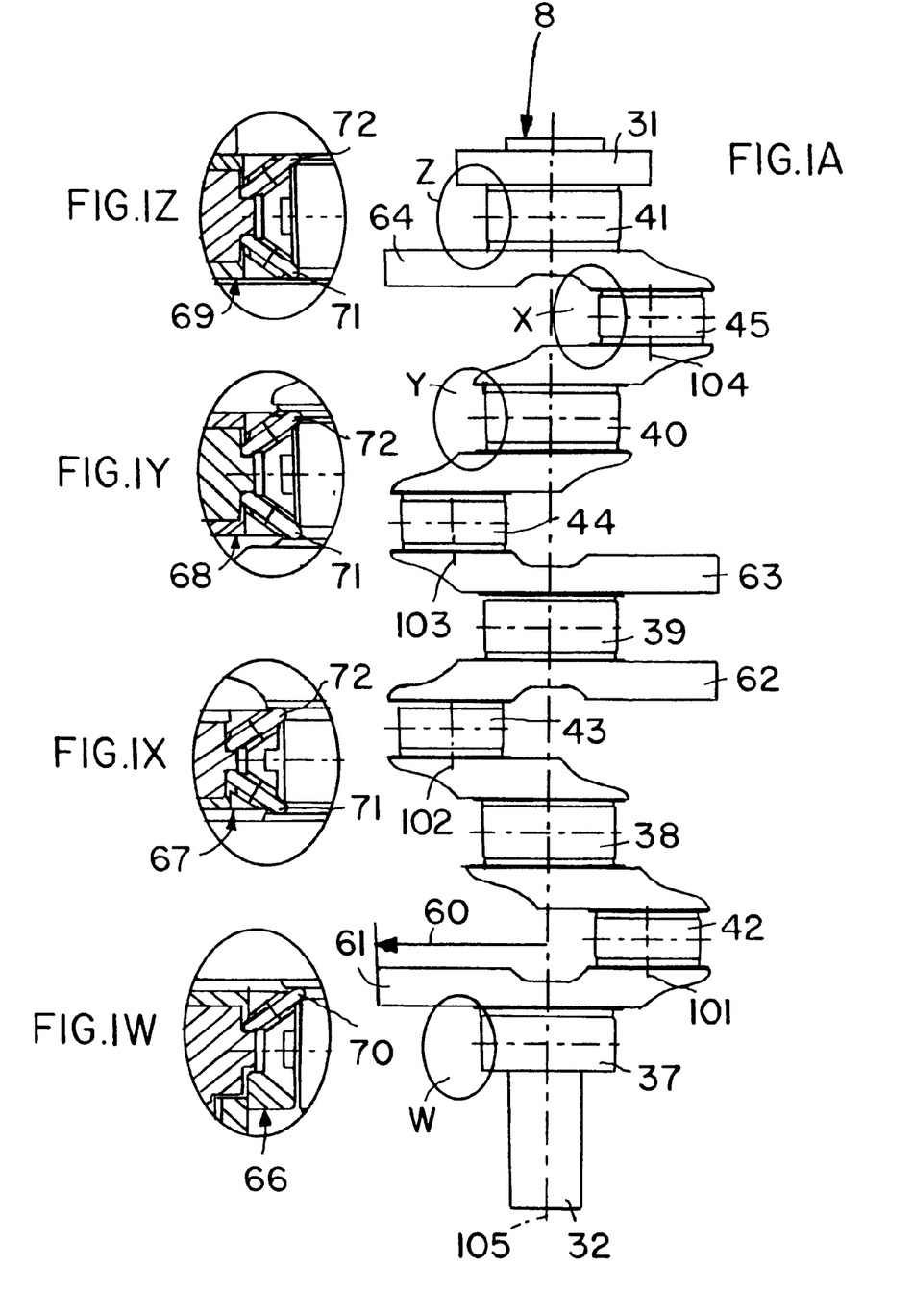
FIG. 1A is an enlarged schematic plan view of the crankshaft received in the hard-rolling machine according to FIG. 1, showing four detail areas 1W, 1X, 1Y, and 1Z.
FIG. 1W is a partial sectional view of a detail area 1W shown in FIG. 1A.
FIG. 1X is a partial sectional view of a detail area 1X shown in FIG. 1A.
FIG. 1Y is a partial sectional view of a detail area 1Y shown in FIG. 1A.
FIG. 1Z is a partial sectional view of a detail area 1Z shown in FIG. 1A.

The hard-rolling devices 18, 20, 22, 24 and 26 are respectively adapted and intended for hard-rolling the main bearing pins 37, 38, 39, 40 and 41 of the crankshaft 8, while the other set of hard-rolling devices 19, 21, 23 and 25 are adapted and intended for hard-rolling the crankpins 42, 43, 44 and 45 of the crankshaft 8 (also see FIG. 1A). The crankpins 42 and 45 are respectively rotationally offset from the crankpins 43 and 44 by 180° about the rotation axis 27.

Each of the respective hard-rolling devices 18 to 26 is constructed in the manner of a scissors jaw having a first scissors arm 46 and a second scissors arm 47 pivotally connected to each other at a scissors pivot point 48. Each one of the hard-rolling devices 18 to 26 further comprises or is connected to a respective scissors drive arrangement 49, for opening and closing and applying the rolling force to the scissors jaw. The drive arrangement 49 is arranged at and connected to the lower ends 50 and 51 of the respective scissors arms 46 and 47 directed away from the rotation axis 27 of the drive apparatus 7.

Each respective drive arrangement 49 comprises a two-armed lever 52 that is pivotally connected to the first scissors arm 46, a displacement cylinder or adjustment cylinder 54 that is connected to the first scissors arm 46 and to a first arm 53 of the two-armed lever 52, and a force applying device 56 that is connected to the second scissors arm 47 and to the second arm 55 of the two-armed lever 52. The force applying device 56 includes two pressure pistons 57 as well as a return piston 58, which all in common are arranged to extend generally perpendicularly to the rotation axis 27 of the drive apparatus 7. When the hard-rolling devices 18 to 26 are in the open position, the return piston 58 constantly pushes back the pressure pistons 57.

The respective drive arrangement 49 of each one of the hard-rolling devices 18 to 26 is so configured and arranged, that the displacement cylinder or adjusting cylinder 54 effectuates the closing and opening motions of the scissors jaws, while the force applying device 56 applies the required hard-rolling force once the scissors jaws of the hard-rolling devices are in the closed position. Thus, the adjusting cylinder 54 is adapted to provide a larger stroke travel with a lower force, while the force applying device 56 covers a much shorter stroke travel with a much greater force. The particular operation and cooperation of the adjustment cylinder 54 and the force applying device 56 will be described in further detail below, and is apparent from FIGS. 2A, 2B and 2C.

The jaw opening width or rolling tool clearance width 59 of each hard-rolling device 18 to 26 (see e.g. FIG. 2A) is greater than twice the maximum structural radius 60 of the crankshaft 8 that is to be roll-hardened. In the present example embodiment, the maximum structural radius 60 is defined by the outer radius of the counter-weights 61, 62, 63 and 64 of the crankshaft 8 relative to the rotation axis 105 (see FIG. 1A). The opening width 59 is sufficient to ensure that the respective hard-rolling devices 18 to 26 have a clearance adequate for receiving and clearing the crankshaft 8 as the crankshaft 8 is loaded into the machine and properly positioned, and as the devices 18 to 26 move into position, as will be described below.

The hard-rolling devices 18 to 26 are respectively provided with a hardening roller head on the first scissors arm 46, and particularly at the free end 65 thereof which is directed generally toward the rotation axis 27 of the drive apparatus 7. More particularly, the hard-rolling device 18 includes a hardening roller head 66, the hard-rolling devices 19, 21, 23 and 25 each respectively include a hardening roller head 67, the hard-rolling devices 20, 22 and 24 each respectively include a hardening roller head 68, and the hard-rolling device 26 includes a hardening roller head 69. The hardening roller heads 67, 68 and 69 each respectively have two hardening rollers 71 and 72 as shown in FIGS. 1X, 1Y and 1Z, while the hardening roller head 66 includes only a single hardening roller 70, as shown in FIG. 1W. This arrangement is, of course, provided to correspond to the arrangement of the gussets or transition radii of the various bearing pins that need to be roll-hardened.

Figure 2A:
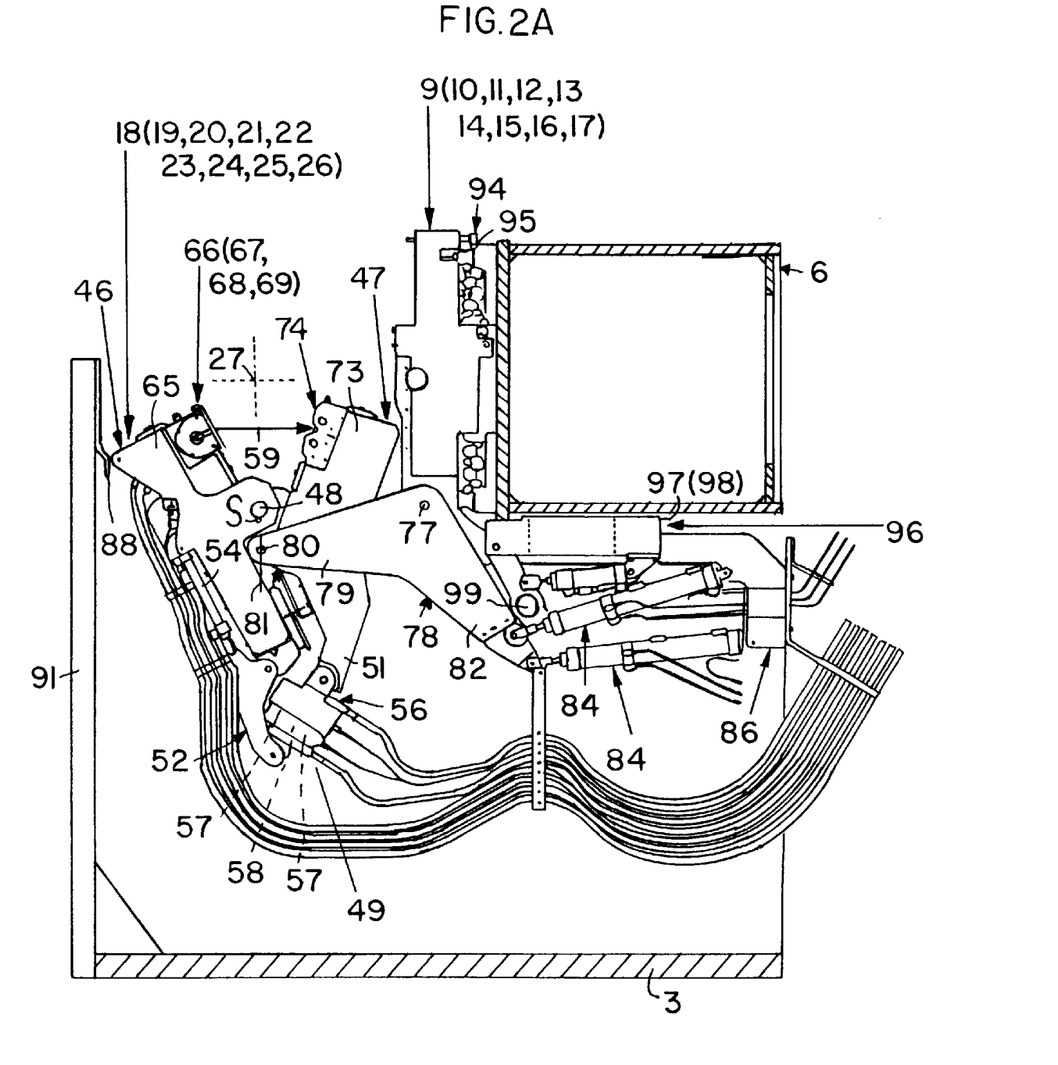
FIG. 2A is a schematic sectional view of the hard-rolling machine, taken along the section line II—II in FIG. 1, with the hard-rolling devices respectively in their open, starting positions.
Figure 2B:
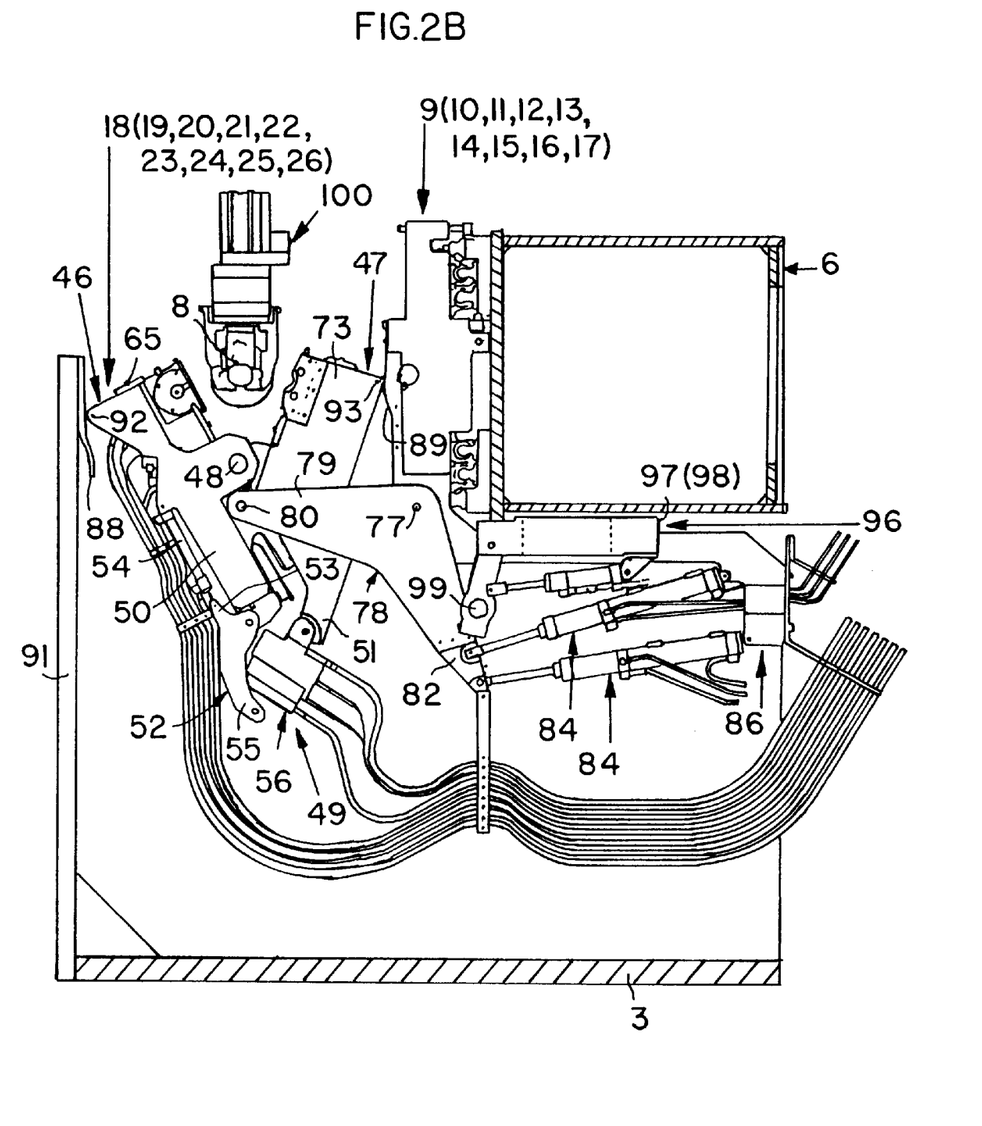
FIG. 2B is a sectional view along the line II—II in FIG. 1, similar to that of FIG. 2A, but with the hard-rolling devices respectively in their pre-closing position relative to a crankshaft that has been brought into position by a partially illustrated crankshaft transport apparatus.
Figure 2C:
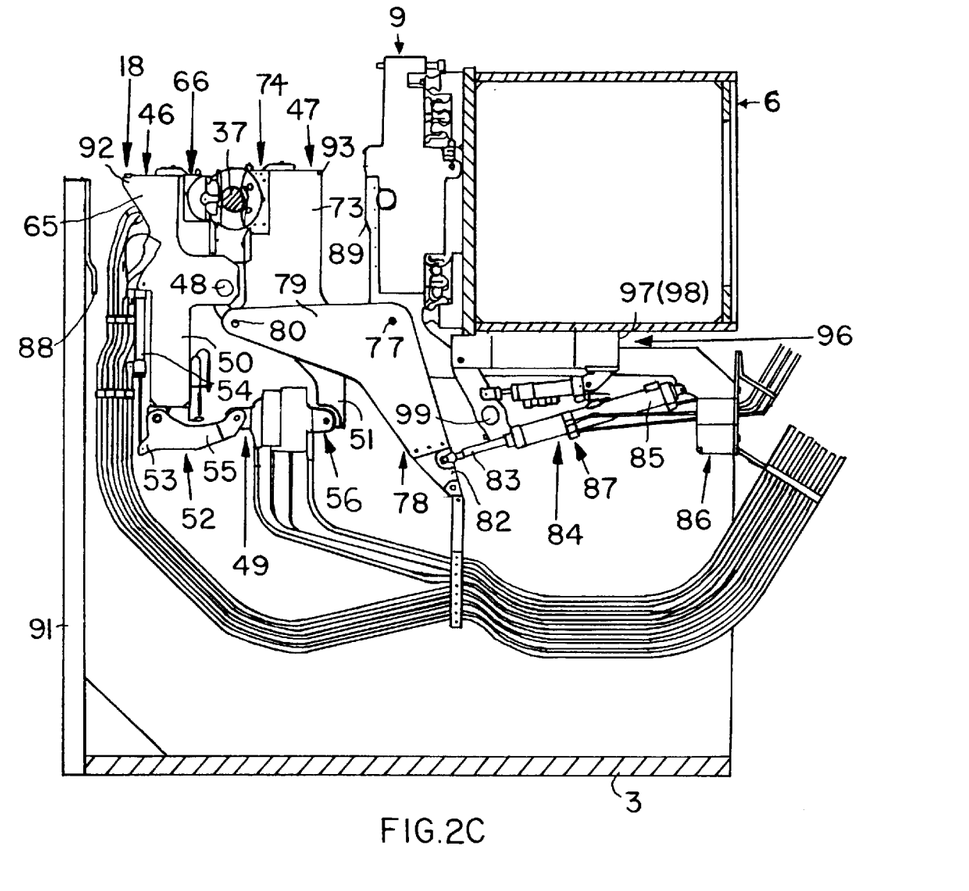
FIG. 2C is a sectional view of the hard-rolling machine and the loaded-in crankshaft along the line II—II in FIG. 1, generally corresponding to FIG. 2B, but showing the respective hard-rolling device closed in operating position on a main bearing pin of the crankshaft.
Figure 2D:
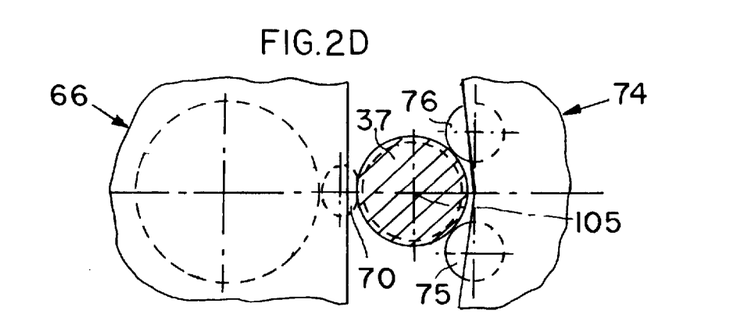
FIG. 2D shows an enlarged partial section taken from FIG. 2C, to particularly show the arrangement of two counter support rollers and one hard-rolling roller according to the detail view of FIG. 1W.

Furthermore, each hard-rolling device 18 to 26 comprises a respective counter-support roller head 74 including two counter support rollers 75 and 76, arranged on the second scissors arm 47 and particularly on the free end 73 thereof that is directed generally toward the rotation axis 27 of the drive apparatus 7, as shown in detail in FIG. 2D. The counter-support rollers 75 and 76 provide the reactive force counter-support for the rolling force applied by the hardening rollers 70, 71, 72 during the roll-hardening process.

The above described features relate to the structures and mechanisms involved in opening and closing the rolling tool jaws and applying the necessary rolling force during the roll-hardening operation. Now the structures involved in supporting and moving the respective hard-rolling devices 18 to 26 will be described. For this purpose, each suspension apparatus 9 to 17, which respectively support the hard-rolling devices 18 to 26, comprises an angled bellcrank lever 78 that is pivotally supported about a pivot axis 77 and that includes a first shank 79 and a second shank 82. The first shank 79 is pivotally connected to the second scissors arm 47 of a respective one of the hard-rolling devices 18 to 26, at a pivotal connection point 80, which is preferably, if possible, arranged to lie at least approximately on the vertical axis of gravity 81 passing through the center of gravity S of the respective hard-rolling device 18 to 26, as shown in FIG. 2A. The other or second shank 82 of each respective angled bellcrank lever 78 is connected to a respective piston rod 83 of a respective piston cylinder unit 84, while the cylinder 85 of each respective piston cylinder unit 84 is connected to the housing 86 of the respective suspension apparatus 9 to 17.

Each respective piston cylinder unit 84 in this example embodiment is a pneumatic cylinder unit with a clamping arrangement 87 for tightly clamping the respective piston rod 83 into a particular position. During the process of hard-rolling a crankshaft 8, each respective pneumatic cylinder unit 84 acts as a pneumatic spring, which allows the respective hard-rolling device 18 to 26 to move in a spring held manner by allowing the respective angled bellcrank lever 78 to pivot about the respective pivot axis 77 while the piston cylinder units 84 provide a pneumatic spring action.

Two guide members respectively providing guide surfaces 88 and 89 are arranged in the machine to cooperate with and provide motion guidance for the respective two free ends 65 and 73 of the two scissors arms 46 and 47 of each hard-rolling device 18 to 26. The guide member 88 is arranged and supported by two vertical spars 90 and 91 secured to the base plate 3. The guide member 89 forms a part of the housing 86 of each one of the suspension apparatus 9 to 17. The two free ends 65 and 73 of the two scissors arms 46 and 47 of each respective hard-rolling device 18 to 26 are respectively provided with guide rollers 92 and 93 that are adapted to cooperate with, and guidedly roll along the guide surfaces 88 and 89, to guide the respective hard-rolling devices 18 to 26 as they are moved into successive operating positions as described below.

At the beginning of a process of hard-rolling a series of crankshafts 8, all nine of the hard-rolling devices 18 to 26 are at first positioned into their respective pre-closing positions shown in FIG. 2B. In this state, the hard-rolling devices 18 to 26 are adjusted in the axial direction along the rotation axis 27 of the drive apparatus 7 to properly correspond to the axial position of the main bearing pins 37 to 41 and the connecting rod or crank bearing pins 42 to 45. This axial adjustment of the hard-rolling devices 18 to 26 is achieved by slidably adjusting the suspension apparatus 9 to 17, which each include or are connected to a cog or pinion drive 94. Each cog or pinion drive 94, which is operated by hand, engages with a corresponding toothed rack 95 that is connected to the cross-support 6.

The pre-closing position of all of the hard-rolling devices 18 to 26, as shown in FIG. 2B, is achieved by means of a positioning apparatus 96, which is secured to the cross-support 6. The positioning apparatus 96 includes two pivoting units 97 and 98 offset from one another in the direction along the rotation axis 27 of the drive apparatus 7. The synchronous operation or movement of the two pivoting units 97 and 98 is ensured by a round rod 99 that is connected to and interconnects the two pivoting units 97 and 98. The round rod 99 is driven by the pivoting units 97 and 98 so as to push against all of the respective second shanks 82 of all of the angled bellcrank levers 78 in common and in unison, so that the two pivoting devices 97 and 98 via the round rod 99 achieve a simultaneous positional adjustment of all of the hard-rolling devices 18 to 26 out of their respective initial positions as shown in FIG. 2A into their respective pre-closing positions as shown in FIG. 2B.

A crankshaft machining system includes the hard-rolling machine 1 itself, and a crankshaft transport apparatus 100. Each crankshaft 8 that is to be roll-hardened is transported by means of the crankshaft transport apparatus 100 directly into a proper position in the hard-rolling machine 1, so that the respective axes 101, 102, 103 and 104 of the crankpins 42 to 45 and the axis 105 of the main bearing pins 37 to 41 lie in the horizontal plane extending through the rotation axis 27 of the drive apparatus 7. In this position, the crankshaft 8 is received and held by and between the head stock 28 and the tail stock 29 of the drive apparatus 7, as already described above.

As soon as the hard-rolling machine 1 has received a crankshaft 8 in this manner, simultaneously, the hard-rolling devices 18, 20, 22, 24 and 26 are closed on the main bearing pins 37, 38, 39, 40 and 41 and the hard-rolling devices 19 and 25 are closed on the crankpins 42 and 45. On the other hand, the hard-rolling devices 21 and 23 that are provided for roll-hardening the crankpins 43 and 44 are at first held in their respective pre-closing positions by two respective corresponding piston cylinder units 84 of which the respective clamping arrangements 87 are actuated to fix the piston cylinder devices. Also, the round rod 99 of the positioning apparatus 96 is retracted, i.e. tilted back into the position shown in FIG. 2A.

During the closing of the hard-rolling devices 19 and 25 onto the crankpins 42 and 45, the received crankshaft 8 undergoes a slight rotation in the clockwise direction as shown in FIG. 2B, since the pivoting radius of the support roller heads 74 is set to the spacing distance between the respective main bearing pins 37 to 41 and the respective connection journal points 80 by which the scissors arms 47 are connected to the respective first shanks 79 of the angled bellcrank levers 78. An adjustable rotation angle control unit 106 at this time controls the headstock 28 of the drive apparatus 7 in such a manner that the received crankshaft 8 is rotated by 180°. Once the crankshaft 8 is in this rotated position, then the hard-rolling devices 21 and 23 are closed on the crankpins 43 and 44, and then the previously activated clamping arrangements 87 are deactivated to unlock the piston cylinder units 84.

While the above scissors jaw closing operation was carried out by actuating the respective adjusting cylinders 54 of the drive arrangements 49, from the position shown in FIG. 2B to the position shown in FIG. 2C, next the force applying devices 56 of the respective drive arrangements 49 are activated to apply the required hard-rolling force. While the crankshaft 8 is rotated by the drive apparatus 7, the main bearing pins 37 to 41 are roll-hardened by the operation of the hard-rolling devices 18, 20, 22, 24 and 26, while simultaneously the crankpins 42 to 45 are roll-hardened by the operation of the hard-rolling devices 19, 21, 23 and 25, with application of the required rolling force.

Once the hard-rolling process for the respective crankshaft 8 has been completed, the rotational angle control unit 106 controls the headstock 28 in such a manner so as to rotate the crankshaft 8 back into its loading position. Then, one after another, all of the clamping arrangements 87 of the piston cylinder units 84 are activated, all of the hard-rolling devices 18 to 26 are opened, and the completed roll-hardened crankshaft 8 is removed and transported out of the hard-rolling machine 1 by means of the crankshaft transport apparatus 100. At this time, the hard-rolling machine 1 can receive the next crankshaft 8 that is to be hard-rolled, in the manner and by the process as already described above.

After being opened, the hard-rolling devices 18, 20, 22, 24 and 26 for the main bearing pins 37 to 41 are moved into a position that corresponds to their respective pre-closing position as shown in FIG. 2B. In contrast, the hard-rolling devices 19, 21, 23 and 25 for the crankpins 42 to 45, after they are opened, reach respective positions slightly above the pre-closing positions shown in FIG. 2B due to the geometric relationships. Because of this, all of the hard-rolling devices 18 to 26 can be simultaneously closed onto the newly received crankshaft 8, without requiring pre-positioning and sequential closing of the crankpin rolling devices as described above for the very first crankshaft 8 in a series. After the simultaneous closing of all of the hard-rolling devices 18 to 26, the clamping arrangements 87 of the piston cylinder units 84 are deactivated one after another, the crankshaft 8 is set into rotation, the main bearing pins 37 to 41 and the crankpins 42 to 45 are roll-hardened, and finally the finished hardened crankshaft 8 is rotated back into its loading position. Just as described above, the finished hardened crankshaft 8 is now removed from the hard-rolling machine 1 and transported away by means of the crankshaft transport apparatus 100.

From the above described sequence of operations, it is apparent that it is only necessary to use the positioning apparatus 96 during the process of hard-rolling the very first crankshaft in a series of similar crankshafts. Once the proper pre-closing position has been achieved, the positioning step does not need to be repeated until a different crankshaft or series of crankshafts is to be hard-rolled.

Figure 3:
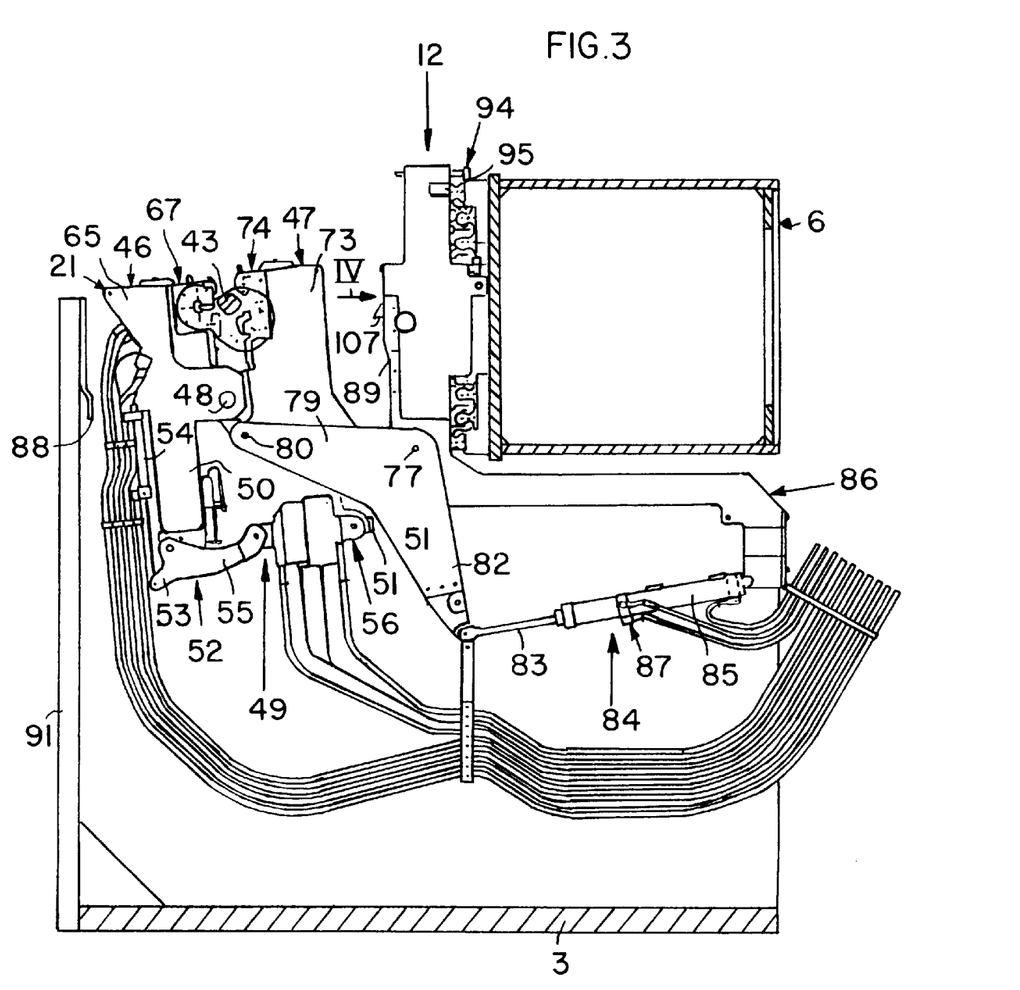
FIG. 3 is a schematical sectional view through the hard-rolling machine and the loaded-in crankshaft, taken along the line III—III in FIG. 1, showing a hard-rolling device closed in position on a crankpin of the crankshaft, and showing an alternative embodiment of the arrangement for positioning the hard-rolling device into its pre-closing position.
Figure 4:
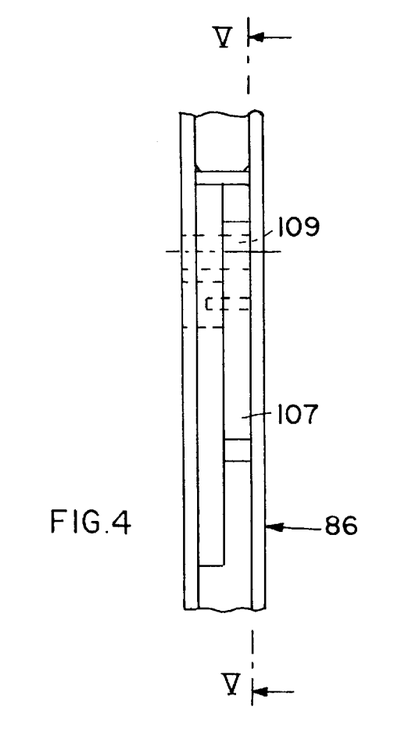
FIG. 4 is an enlarged partial view taken in the direction of arrow IV in FIG. 3.
Figure 5:
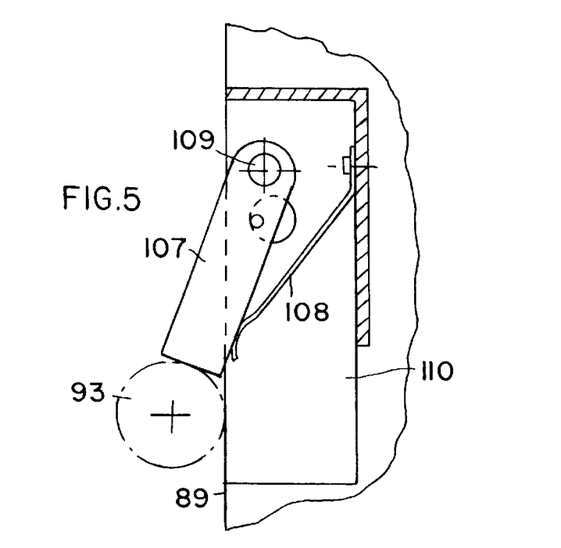
FIG. 5 is a partial sectional view taken along the section line V—V in FIG. 4.

FIGS. 3, 4 and 5 show an example embodiment alternative to the above described positioning apparatus 96. In this alternative embodiment, a pivot latch 107 is arranged on the guide member 89 of each respective one of the suspension apparatus 9 to 17 for positioning each respective hard-rolling device 18 to 26 into its pre-closing position as shown in FIG. 2B. Each pivot latch 107 cooperates with a leaf spring 108 and is pivotable to a limited extend about a pivot bolt 109. As a result, the leaf spring 108 pivotally biases the pivot latch 107 into a locking position as shown in FIG. 5.

In this locking position, the pivot latch 107 acts as a stop or dog that blocks the guide roller 93 from travelling further upward as it rolls along the guide member 89. On the other hand, as the guide roller 93 moves downward along the guide member 89 while being pressed laterally thereagainst, the pivot latch 107 is pressed against the force of spring 108 into a recess 110, whereby the pivot latch 107 does not block the downward motion of the guide roller 93.

Figure 6:
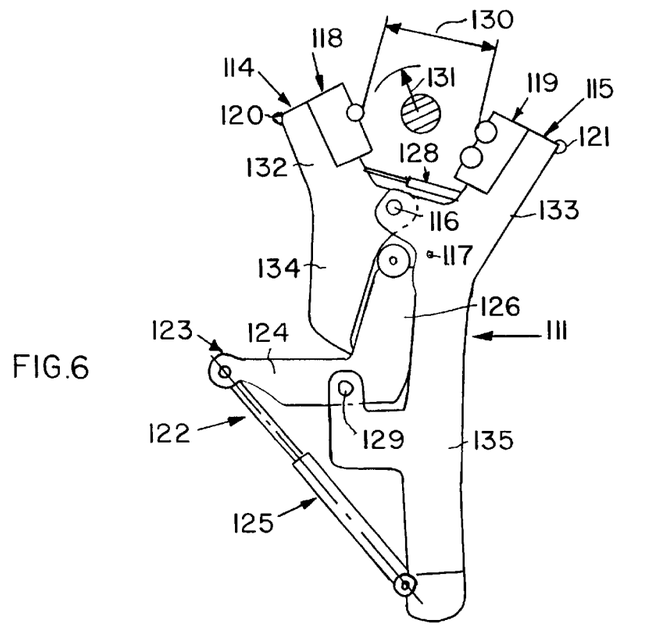
FIG. 6 is a schematic enlarged detail view of another embodiment of a hard-rolling device, seen along a section through a main bearing pin of a crankshaft.
Figure 7:
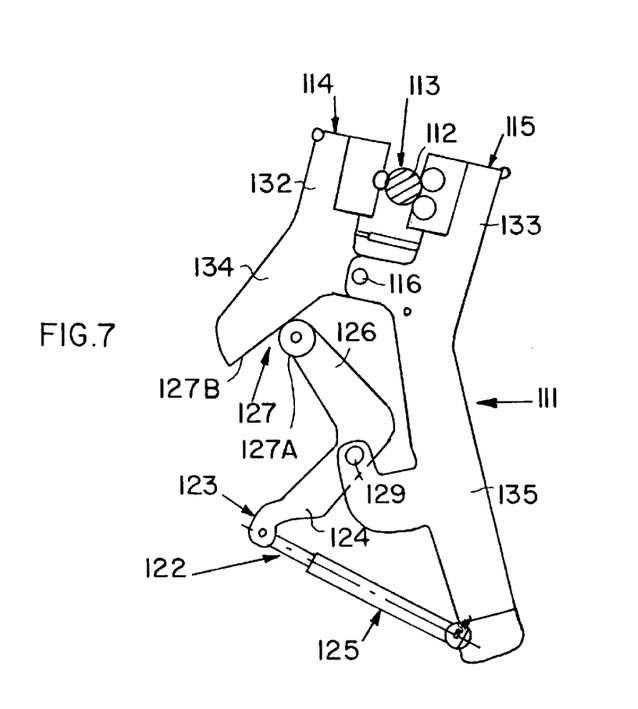
FIG. 7 is a schematic view generally corresponding to FIG. 6, but showing the hard-rolling device in its closed position on the main bearing pin of the crankshaft, which is shown in section.

FIGS. 6 and 7 schematically show another example embodiment of a hard-rolling device 11, taken along a section plane extending through a main bearing pin 112 of a crankshaft 113. Analogously to each hard-rolling device 18 to 26 as described above, the alternative hard-rolling device 111 comprises two scissors arms 114 and 115, pivotally joined to each other at a scissors pivot point 116, as well as a journal connection point 117 by which the hard-rolling device 111 may be supported, a hardening roller head 118, a counter-support roller head 119, two guide rollers 120 and 121, and a jaw-closing drive arrangement 122.

A major difference between the present embodiment and the one described above is that the present drive arrangement 122 comprises an angled bellcrank lever 123 that has a first lever arm 124 and a second lever arm 126, and that is pivotally connected to one of the scissors arms 115. The drive arrangement 122 further comprises a piston cylinder arrangement 125 connected to the scissors arm 115 and the first lever arm 124 of the angled bellcrank lever 123, as well as a cam drive arrangement 127 formed by the second lever arm 126 of the angled bellcrank lever 123 and the other scissors arm 114. Specifically, a cam follower roller 127A rotationally mounted on the end of the lever arm 126 follows along a cam surface 127B provided on the end 134 of the scissors arm 114. The drive arrangement 122 further includes a spring unit 128 arranged to spread apart the rolling device jaws, i.e. to provide a spring bias force that biases the hard-rolling device 11 toward its open position. The angled bellcrank lever 123 is pivotable about a bolt 129 connected to the scissors arm 115. In this case as well, the hard-rolling device 111 has an opening width 130 that is greater than the doubled structural radius 131, i.e. greater than twice the maximum structural radius 131, of the crankshaft 113. In FIGS. 6 and 7, the ends of the scissors arms 114 and 115 directed generally toward the rotation axis 27 of the drive apparatus 7 are designated by reference numbers 132 and 133, while the opposite ends of the scissors arms 114 and 115 directed generally away from the rotation axis 27 of the drive apparatus 7 are designated with reference numbers 134 and 135.

With this arrangement of FIGS. 6 and 7, by appropriate configuration of the cam surface 127B, it is possible to provide a single piston cylinder arrangement 125 to replace the separate adjusting cylinder 54 and the force applying device 56, for carrying out the opening and closing of the tool jaws and for carrying out the rolling force application.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A machine for roll-hardening a workpiece, comprising:
   a rotational drive apparatus adapted to hold and rotationally drive the workpiece about a rotational axis;
   at least one suspension apparatus arranged to be slidably repositionable along a direction parallel to said rotational axis;
   at least one hardening rolling device respectively comprising first and second scissors arms that are pivotally connected together at a scissors pivot point and that each have a respective first end directed relatively toward said rotational axis and a respective second end directed relatively away from said rotational axis, a hardening roller head arranged on said first end of said first scissors arm, and a counter support roller head arranged on said first end of said second scissors arm adjacent and spaced apart from said hardening roller head by a jaw clearance between said hardening roller head and said counter-support roller head;
   a respective scissors drive arrangement connected to said second ends of said first and second scissors arms of each said at least one hardening rolling device and adapted to pivotally drive said first and second scissors arms relative to each other so as to selectively increase and decrease said jaw clearance, wherein said at least one hardening rolling device and said scissors drive arrangement are so configured and arranged such that a maximum of said jaw clearance is greater than twice a maximum structural radius of the workpiece;
   a respective angled bellcrank lever that includes a first shank and a second shank extending at a non-linear angle relative to each other, and that movably connects and supports each said at least one hardening rolling device respectively from said at least one suspension apparatus, whereby said respective angled bellcrank lever is pivotally connected to said at least one suspension apparatus, and said at least one hardening rolling device is pivotally connected to said first shank of said angled bellcrank lever;
   a respective piston cylinder unit having a first end respectively connected to said at least one suspension apparatus and a second end respectively connected to said second shank of said respective angled bellcrank lever; and
   a first guide member arranged to guidingly cooperate with said first end of said first scissors arm, and a second guide member arranged to guidingly cooperate with said first end of said second scissors arm.

2. The machine according to claim 1, adapted for the workpiece being a crankshaft.

3. The machine according to claim 1, wherein said at least one hardening rolling device is pivotally connected to said first shank of said angled bellcrank lever at one of said scissors arms.

4. The machine according to claim 1, wherein said scissors drive arrangement is adapted to pivotally drive said first and second scissors arms relative to each other so as to open and close said hardening roller head and said counter support roller head about the workpiece, and so as to apply a hardening rolling force to the workpiece through said hardening roller head and said counter support roller head once said hardening roller head and said counter support roller head are closed about the workpiece.

5. The machine according to claim 1, wherein said respective scissors drive arrangement connected to each said at least one hardening rolling device respectively comprises a two-armed lever that is pivotally connected to one of said scissors arms and that includes first and second lever arms, an adjusting cylinder connected to said one of said scissors arms and to said first lever arm of said two-armed lever, and a force applying device connected to another of said scissors arms and to said second lever arm of said two-armed lever.

6. The machine according to claim 5, wherein said force applying device comprises a plurality of pressure pistons arranged with a respective stroke axis extending tangentially to a circle about said rotation axis.

7. The machine according to claim 5, wherein said adjusting cylinder is adapted to apply a first relatively Lower force over a first relatively longer travel stroke for opening and closing said hardening roller head and said counter support roller head about the workpiece, and said force applying device is adapted to apply a second relatively greater force over a second relatively shorter travel stroke for applying a hardening rolling force once said hardening roller head and said counter support roller head are closed about the workpiece.

8. The machine according to claim 1, wherein said respective scissors drive arrangement connected to each said at least one hardening rolling device respectively comprises an angled lever that is pivotally connected to one of said scissors arms and that includes first and second lever arms, a piston cylinder arrangement connected to said one of said scissors arms and to said first lever arm, a cam drive operatively connecting another of said scissors arms with said second lever arm, and a spring unit arranged to bias said first and second scissors arms such that said hardening roller head and said counter support roller head are urged apart from each other.

9. The machine according to claim 8, wherein said cam drive comprises a cam surface provided on said another of said scissors arms, and a cam follower roller arranged on said second lever arm and urged into following contact along said cam surface by an urging force of said spring unit.

10. The machine according to claim 8, wherein said cam drive is adapted to drive said scissors arms to selectively open and close said hardening roller head and said counter support roller head about the workpiece, and to apply a hardening rolling force once said hardening roller head and said counter support roller head are closed on the workpiece.

11. The machine according to claim 1, wherein each said respective piston cylinder unit respectively connected to said at least one suspension apparatus comprises a piston, a piston rod, a cylinder, and a clamping arrangement arranged and adapted to clamp said piston rod at a selected position relative to said cylinder.

12. The machine according to claim 1, wherein each said respective piston cylinder unit is a pneumatic piston cylinder unit.

13. The machine according to claim 1, further comprising a first guide roller arranged on said first end of said first scissors arm so as to guidedly roll along said first guide member, and a second guide roller arranged on said first end of said second scissors arm so as to guidedly roll along said second guide member.

14. The machine according to claim 1, wherein said machine comprises respective pluralities of said hardening rolling devices, said scissors drive arrangements, said suspension apparatus, and said angled bellcrank levers, and wherein said machine further comprises a positioning apparatus for positioning said plural hardening rolling devices into a pre-closing position.

15. The machine according to claim 14, wherein said positioning apparatus comprises two pivoting units, a cross-bar pivotally supported from said pivoting units and arranged to push against each said second shank of each said respective angled bellcrank lever, and two piston cylinder devices respectively connected between said two pivoting units and two ends of said cross-bar so as to pivotally drive said cross-bar to push against said second shanks.

16. The machine according to claim 1, further comprising a pivot latch arranged on at least one of said first guide member and said second guide member for positioning said hardening rolling device into a pre-closing position.

17. The machine according to claim 1, wherein said rotational drive apparatus is slidably repositionable along a direction parallel to said rotational axis.

18. The machine according to claim 1, comprising respective pluralities of said suspension apparatus, said hardening rolling devices, said scissors drive arrangements, and said angled bellcrank levers.

19. An apparatus for roll hardening a workpiece, comprising:
  means for supporting and rotationally driving the workpiece about a rotational axis;
  a plurality of hardening rolling devices that each respectively include a hardening roller and a counter support roller arranged adjacent and selectively spaced apart from each other with a jaw clearance therebetween and adapted to receive the workpiece therebetween, wherein a maximum of said jaw clearance is greater than twice a maximum radius of the workpiece;
  a plurality of rolling device drive means respectively connected to said hardening rolling devices for selectively opening and closing said jaw clearance and for applying a hardening rolling force to the workpiece between said hardening roller and said counter support roller;
  a plurality of suspension support members arranged to be slidably repositionable along a direction parallel to said rotational axis;
  a plurality of pivotable lever members respectively pivotably connecting said hardening rolling devices to and supporting said hardening rolling devices from said suspension support members;
  a plurality of pivot drive means for pivotally driving said pivotable lever members; and
  first and second guide members for guiding a motion of said hardening rolling devices.

20. The apparatus according to claim 19, wherein each one of said rolling device drive means respectively comprises first means for opening and closing said jaw clearance with a relatively lower first force over a relatively longer first travel distance, and second means for applying said hardening rolling force with a relatively greater second force over a relatively shorter second travel distance.

* * * * *